Aug. 3, 1948.                M. SITNEY                2,446,196
                          DOUBLE SEAL VALVE
Filed March 20, 1945                              2 Sheets-Sheet 1

INVENTOR.
MASSEY SITNEY
BY
Ralph Chappell
ATTORNEY.

Aug. 3, 1948.                M. SITNEY                2,446,196
                           DOUBLE SEAL VALVE
Filed March 20, 1945                              2 Sheets-Sheet 2

INVENTOR.
MASSEY SITNEY
BY
Ralph L Chappell
ATTORNEY

Patented Aug. 3, 1948

2,446,196

UNITED STATES PATENT OFFICE 2,446,196

DOUBLE SEAL VALVE

Massey Sitney, Berkeley, Calif.

Application March 20, 1945, Serial No. 583,830

2 Claims. (Cl. 251—159)

(Granted under the act of March 3, 1883, as amended April 30, 1928; 370 O. G. 757)

This invention relates to a valve particularly adapted for use as an exhaust valve for submarine engines.

When a submarine is cruising on the surface, the exhaust from the engines is released into the atmosphere through an exhaust valve. The valve must be capable of being closed so that it is watertight in order to exclude water from the engines during periods while the submarine is submerged. The hot exhaust gases from the engine have a tendency to damage the valve so that it is not watertight when closed. To overcome this problem, I have designed a double seal valve which when open will pass exhaust gases without damaging the valve and which when closed is watertight.

It is therefore an object of my invention to provide a valve which is capable of passing hot gases or other fluids when open and which is watertight when closed.

It is a further object of my invention to provide a valve having two seats and two cooperating valve discs in which the discs are liquid cooled when the valve is open.

It is a further object of my invention to provide a valve mechanism having the characteristics mentioned above and which may be used in existing types of valve bodies and operated by existing types of operating mechanism.

The manner of accomplishment of these and other objects of my invention will become apparent upon a study of the specification which follows and the drawing wherein.

Figure 1:
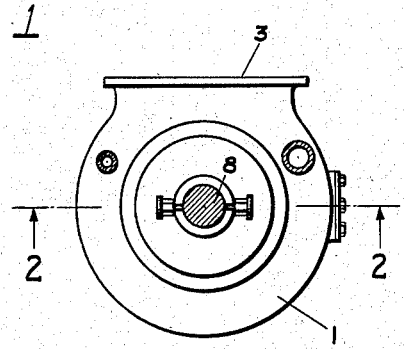
Fig. 1 shows a top plan view of the valve of my invention.

Referring more in detail to the drawing:

The valve comprises a body, designated generally as 1. This body is structurally similar to the valve bodies used in submarine exhaust valves in the prior art. This feature makes it possible to install my improved valve mechanism in existing installations without the necessity of replacing the entire valve.

The lower end of the body is adapted to be secured to the outside wall of a submarine or other structure and has an opening 2 to receive exhaust gases or other fluids which may be at quite a high temperature. The body has a discharge 3 in a side wall through which the exhaust gases or other fluids pass out of the valve, normally into the atmosphere.

The valve body is preferably water cooled. The body proper is surrounded by a jacket 4 which is provided with inlet and outlet pipes 5 and 6. Cooling liquid enters the space between the body proper and the jacket through the inlet pipe 5 from a suitable source, not shown, and is discharged through the outlet pipe 6.

The body has an opening 7 in the upper wall adapted to receive the valve stem 8, which is vertically slidable through the opening 7. The stem may be raised or lowered to operate the valve by any suitable mechanism not shown. The mechanism may be the identical mechanism used to operate submarine exhaust valves in the prior art, thus making it possible for my improved valve to be installed in a submarine without the necessity of modifying the valve operating mechanism.

Figure 3:
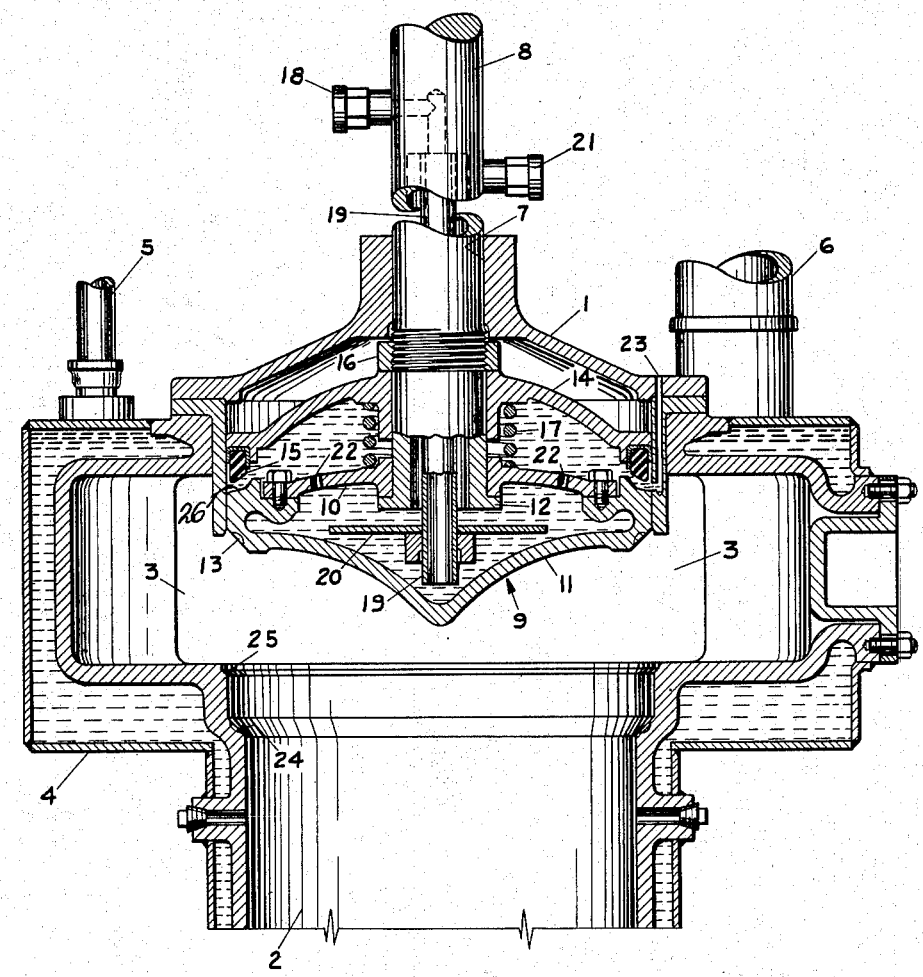
Fig. 3 shows a vertical sectional view of the valve of my invention similar to Fig. 2, but with the valve open.

Adjacent the lower end of the stem is a valve disc, designated generally as 9. The valve disc 9 is hollow, being preferably made in two pieces to facilitate assembly. The upper piece 10 is secured to the lower piece 11 as by the bolts illustrated or by other suitable means. The upper piece 10 has an opening in the center adapted to receive the stem 8 which terminates in the hollow space within the disc. The disc is thus slidably engaged on the valve stem. The valve stem has a collar 12 adjacent the lower end adapted to bear against the lower surface of the upper piece 10 and thus to transmit upward movement of the stem to the valve disc and to limit downward sliding movement of the disc relatively to the stem. The lower piece 11 has a seat portion 13 extending around the circumference as best shown in Fig. 3.

A second disc 14 is slidably engaged with the valve stem above the valve disc. The second disc 14 has secured thereto a resilient gasket 15 extending around the circumference. A second collar 16 is secured to the valve stem, as by threaded engagement, above the second disc. The second collar 16 is adapted to transmit downward movement of the stem to the discs and to limit upward sliding movement of the discs relatively to the stem.

Located in the space between the valve disc 9 and the second disc 14 is a coil spring 17 which tends to force the discs apart to the limits permitted by the collars 12 and 16.

The lower portion of the stem 8 is hollow in order to provide an inlet and outlet for the cooling system. An inlet fitting 18 is provided in the stem above the valve body and leads to a tube 19, which extends through the hollow portion of the stem with its walls in spaced relation to the walls of the stem, and which terminates in the lower portion of the hollow valve disc 9. A baffle plate 20 is secured to the outside of the tube 19 adjacent the lower end thereof in order to force the cooling liquid into the outer portions of the valve disc 9. The major portion of the cooling liquid is discharged from the valve disc through the space between the walls of the tube 19 and the walls of the stem 8 and thence through the discharge fitting 21, located in the stem above the valve body.

The upper plate of the valve disc 9 contains a plurality of apertures 22 through which a portion of the cooling liquid may pass into the space between the discs.

In order to provide an egress for the cooling liquid which passes into the space between the discs, one or more apertures 23 are provided in the valve body. The inlet ends of the apertures 23 are aligned with the space between the discs when the valve is open. The outlet ends of the apertures 23 are open to the atmosphere.

The valve body has a lower seat 24 adapted to cooperate with the seat 13 on the valve disc 9 when the valve is closed. The valve body also has an upper seat 25 adapted to cooperate with the resilient gasket 15 on the second disc 14 when the valve is closed. When sealing the valve, the gasket 15 is compressed partially against the seat 25 and partially against an upper seating surface 26 formed on disc 9.

Operation

Figure 2:
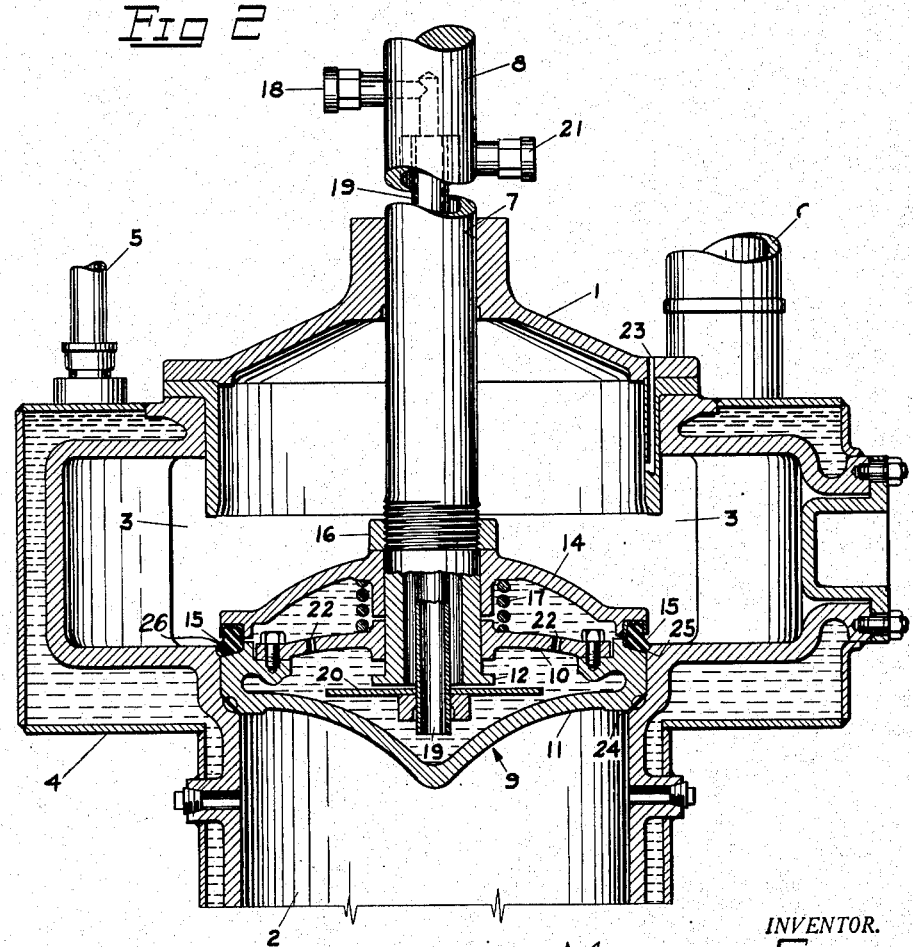
Fig. 2 shows a vertical sectional view of the valve of my invention, with the valve closed, taken substantially on the line 2—2 of Fig. 1.

The valve is shown in closed position in Fig. 2. The seat 13 on the valve disc 9 cooperates with the lower seat 24 on the body and the resilient gasket 15 cooperates with the upper seat 25 on the body to seal the valve and make it watertight.

When it is desired to open the valve to permit gases or other fluids to pass therethrough, the stem 8 is raised and may be maintained in raised position by suitable mechanism not shown to the position illustrated in Fig. 3.

When the stem is raised, the spring 17 first forces the valve disc 9 downward relatively to the stem to the limit permitted by the collar 12. Thus the amount of separation between the discs is immediately increased and the resilient gasket is maintained out of contact with the valve disc, which, although liquid cooled, may attain a relatively high temperature. Further raising of the stem lifts the valve disc and also the second disc and the associated mechanism to the position shown in Fig. 3. Opening of the valve in this manner thus permits fluids which enter at the inlet 2 to be discharged through the outlet 3.

The cooling liquid inlet 18 is connected to a suitable source of cooling liquid not shown. Ordinarily the cooling liquid will be sea water. The cooling liquid passes through the inlet 18 and tube 19 into the hollow valve disc and is diverted by the baffle 20 into the outer portions of the valve disc. The major portion of the cooling liquid passes out of the valve disc through the space between the walls of the tube 19 and the walls of the stem 8 into the outlet 21 from which it is discharged. A smaller portion of the cooling liquid passes through the openings 22 in the upper plate 10 of the valve disc into the space between the discs from which it is discharged through the openings 23. Some of the liquid may tend to leak from the space between the discs into the space below the valve disc. Any liquid that does leak into this space is quickly picked up by the exhaust gases or other fluid transmitted by the valve and discharged through the main discharge opening 3 of the valve, normally into the atmosphere.

Hot fluids passing through the valve may damage the seats 24 and 25 on the valve body. Damage to these seats is, however, minimized by the cooling liquid between the valve body proper and the jacket 4. The hot fluids may also damage the seat 13 on the valve disc but this damage is minimized by the cooling liquid within the valve disc. However, the damage that does occur to these metal seats is sufficient to render them incapable of forming a watertight seal after long usage.

The valve is made watertight when closed by the action of the resilient gasket 15 bearing on the seat 25 on the body. By virtue of the action of the spring 17 forcing the discs 9 and 14 apart this gasket is kept in direct contact with and continuously bathed by the cooling liquid whenever the valve is open. There is a constant flow of liquid through the apertures 22 into the space between the discs and over the resilient gasket and through the openings 23. The force of the spring 17 keeps the gasket out of contact with the hot valve disc until the valve is closed. This action of the spring 17 simultaneously serves to keep the gasket 15 out of the direct path of hot exhaust gases until the flow of these gases is shut off by the seating of the disc 9. When the resilient gasket contacts the seat 25, it yields to fit any irregularities produced by the hot fluids on the seat and thus seals the valve. It will be observed that during the closing operation of the valve the cooling liquid in the space between the discs is poured over the seat 25 and the seating surface 26 and thus cools these parts before the resilient gasket seats. This action cools and moistens the metal seating parts permitting the gasket 15 to slide easily onto its seat and eliminating the possibility of vulcanizing the resilient gasket by contact with a hot valve seat.

From the foregoing, it will be seen that I have provided a valve which is capable of passing hot fluids without damage to the valve and which is watertight when closed. However, it will be apparent to those skilled in the art that the valve is susceptible to numerous modifications without departing from the spirit of my invention. Therefore, I do not wish to be limited by the disclosure set forth hereinabove but only by the scope of the appended claims.

The invention described herein may be manufactured and used by or for the Government of the United States of America for governmental purposes without the payment of any royalties thereon or therefor.

I claim:

1. A valve comprising a body having an inlet in the base, a discharge in a side wall, an opening in the top, and upper and lower seats extending around the inner surface between the inlet and discharge, a hollow stem passing through the opening in the top of the body and vertically movable therein, a hollow valve disc adjacent the lower end of the stem, a second disc above the valve disc, said discs being slidably engaged with said stem, said stem having means adjacent the discs acting to transmit vertical movement of the stem to the discs and to limit sliding of the discs along the stem, said valve disc having a seat cooperable with the lower seat on the body and said second disc having a resilient gasket coperable with the upper seat on the body to seal the valve when the stem is lowered, spring means between said valve disc and said second disc acting to separate the discs and maintain the gasket in spaced relation to the valve disc when the stem is raised, and means for circulating cooling liquid through the discs comprising a tube extending longitudinally through the lower portion of the stem in spaced relation to the walls thereof and having an inlet above the body and a discharge into the lower portion of the valve disc, said valve disc having a discharge for the cooling liquid in the upper portion thereof into the space between the tube and the walls of the stem, said stem having a discharge above the body, the upper wall of said valve disc having one or more openings leading to the space between the discs whereby a portion of the cooling liquid may flow into the space between the discs, said body having a discharge opening in alignment with the space between the discs when the stem is raised.

2. A valve comprising a body having an inlet in the base, a discharge in a side wall, an opening in the top, and upper and lower seats extending around the inner surface between the inlet and discharge, a hollow stem passing through the opening in the top of the body and vertically movable therein, a hollow valve disc engaged with the stem adjacent the lower end thereof, a second disc engaged with the stem above the valve disc, at least one of said discs being slidable on said stem, said stem having means adjacent the discs acting to transmit vertical movement of the stem to the discs and to limit sliding of the discs along the stem, said valve disc having a seat cooperable with the lower seat on the body and said second disc having a resilient gasket cooperable with the upper seat on the body to seal the valve when the stem is lowered, spring means between said valve disc and said second disc acting to separate the discs and maintain the gasket in spaced relation to the valve disc when the stem is raised, and means for circulating cooling liquid through the discs, comprising a tube extending longitudinally through a portion of the stem in spaced relation to the walls thereof and having an inlet above the body and a discharge into the lower portion of the valve disc, the upper wall of said valve disc having one or more discharge openings arranged in such manner that at least part of the cooling liquid may flow into the space between the discs when the stem is raised.

MASSEY SITNEY.

REFERENCES CITED

The following references are of record in the file of this patent:

UNITED STATES PATENTS

| Number | Name | Date |
|---|---|---|
| 477,372 | Kennedy | June 21, 1892 |
| 1,313,122 | Schumann | Aug. 12, 1919 |
| 2,341,018 | Clapp | Feb. 8, 1944 |